United States Patent
Daudi

(10) Patent No.: US 6,260,669 B1
(45) Date of Patent: Jul. 17, 2001

(54) BRAKE ROTOR WITH AIRFLOW DIRECTOR

(75) Inventor: Anwar R. Daudi, Ann Arbor, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/364,589

(22) Filed: Jul. 30, 1999

(51) Int. Cl.$^7$ ..................................................... F16D 55/02
(52) U.S. Cl. .............................. 188/71.6; 188/218 XL; 188/264 A
(58) Field of Search ............................ 188/218 XL, 218 R, 188/264 A, 264 AA, 73.2, 264 R, 71.6, 18 A, 17, 26; 192/107 R, 113.23, 113.26, 113.2

(56) References Cited

U.S. PATENT DOCUMENTS

| | | | |
|---|---|---|---|
| 3,298,476 | * | 1/1967 | Day ................................ 188/264 AA |
| 3,394,780 | * | 7/1968 | Hodkinson ..................... 188/218 XL |
| 3,648,814 | | 3/1972 | Barron . |
| 4,177,883 | | 12/1979 | Margetts . |
| 4,288,942 | * | 9/1981 | Nicholl .................................. 446/48 |
| 4,440,270 | | 4/1984 | Ross . |
| 4,561,522 | | 12/1985 | Dayen . |
| 4,621,715 | | 11/1986 | Denton . |
| 4,674,606 | | 6/1987 | Denton . |
| 4,772,299 | | 9/1988 | Bogusz . |
| 4,811,822 | * | 3/1989 | Estaque ........................... 188/264 A |
| 4,830,150 | | 5/1989 | Denton . |
| 4,846,315 | | 7/1989 | Dayen . |
| 4,901,826 | | 2/1990 | Preiss . |
| 4,928,798 | | 5/1990 | Watson et al. . |
| 4,950,035 | | 8/1990 | Villarreal et al. . |
| 4,989,697 | | 2/1991 | Denton . |
| 5,284,230 | | 2/1994 | Takaki . |
| 5,427,212 | | 6/1995 | Shimazu et al. . |
| 5,492,205 | * | 2/1996 | Zhang ........................... 188/218 XL |
| 5,526,905 | | 6/1996 | Shimazu et al. . |
| 5,878,848 | * | 3/1999 | Zhang ........................... 188/218 XL |

* cited by examiner

Primary Examiner—Robert J. Oberleitner
Assistant Examiner—Mariano Sy
(74) Attorney, Agent, or Firm—Marshall & Melhorn, LLC

(57) ABSTRACT

A vented disc brake rotor having an airflow director for funneling air into the braking plate vents thereby improving the cooling effectiveness of the rotor. The vented disc brake rotor includes first and second braking plates connected together in a mutually parallel, spaced apart relationship. Braking plate fins are disposed between the inwardly facing surfaces of the braking plates forming a plurality of braking plate vents between the braking plates. The rotor includes an airflow director having an annular flange extending generally radially inwards from the radially inner end of one of the braking plates. The flange includes an inner surface forming an angle with respect to the inner surface of the other braking plate such that the distance between these inner surfaces increases as the flange extends radially inwards. A plurality of director fins are disposed between the flange and the inner surface of one of the braking plates. The cross sectional area of the director vent inlets are larger than the cross sectional area of the braking plate vent inlets. The larger director vent inlets and the angled inner flange surface create a funnel which directs more air into the braking plate vents thereby improving the cooling effectiveness of the rotor.

22 Claims, 3 Drawing Sheets

BRAKE ROTOR WITH AIRFLOW DIRECTOR

BACKGROUND OF THE INVENTION

The present invention relates to brake rotors for motor vehicles. More particularly the present invention relates to directing airflow into the vents of a vented brake rotor.

Wheeled vehicles are typically slowed and stopped with a braking system that generates frictional forces. One known braking system is the disc braking system which includes a rotor attached to one or more of the vehicle wheels for rotation therewith. The rotor has an annular peripheral section having a pair of outwardly facing annular friction surfaces also known as the braking surfaces.

The disc brake system also includes a caliper assembly secured to a non-rotating component of the vehicle, such as the vehicle frame. The caliper assembly includes a pair of brake pads, each having a backing plate and brake lining material attached thereto. A pad is disposed adjacent each braking surface such that the brake lining material is adjacent the braking surface. The caliper assembly conventionally includes at least one moveable piston operatively connected to the backing plate of at least one of the brake pads. When the driver brakes the vehicle, hydraulic or pneumatic forces move the piston which clamps the brake lining material of the pads against the braking plates of the rotating rotor. As the pads press against the moving rotor braking surfaces, frictional forces are created which oppose the rotation of the wheels and slow the vehicle.

Disc brake systems generate a significant amount of heat during braking by converting the vehicle's kinetic energy primarily to thermal energy when the brake pads are actuated to engage the braking surfaces. As a result, the rotor temperature rises. An excessive temperature rise is undesirable since it may deform the rotor and degrade braking performance.

To improve the performance and wear of disc brake systems, it is desirable to dissipate the heat generated during braking. Vented rotors dissipate heat using a plurality of air passages known as vents which are formed through the peripheral section. For example, some vented rotors include a peripheral section having a pair of annular braking plates connected together in a mutually parallel, spaced apart relationship. Fins connect the inwardly facing surfaces of the braking plates together forming a plurality of passages or vents between the braking plates. As the rotor turns, air flows through the braking plate vents absorbing heat from the rotor thereby cooling the rotor.

The cooling effectiveness of the rotor vents depends in part on the quantity of air moved through the vents. A higher airflow rate through the vents dissipates more heat from the rotor. Therefore, it is desirable to move as much air as possible through the vents as the rotor turns.

It is known that the shape, spacing and orientation of the fins determines the airflow rate through the vents. Various patterns of long and short curved fins have been used to create curved radial vents having varying widths. For example, Shimazu, et al (U.S. Pat. No. 5,427,212) teaches the use of long and short curved fins disposed adjacent each other in alternating fashion to achieve a high airflow rate.

However, it is desirable to provide a vented brake rotor that moves more air through the vents as the rotor turns to improve the cooling effectiveness of the rotor vents during braking.

SUMMARY OF THE INVENTION

The present invention is an vented disc brake rotor having an airflow director for funneling air into the braking plate vents. The airflow director increases the airflow rate through the vents thereby improving the cooling effectiveness of the rotor.

The vented disc brake rotor includes first and second braking plates extending radially outwards from a central hat section. The braking plates are connected together in a mutually parallel, spaced apart relationship. Braking plate fins connect the inwardly facing surfaces of the braking plates together forming a plurality of radial passages or braking plate vents between the braking plates. Each braking plate vent is defined between adjacent braking plate fins and the inner surfaces of the braking plates. The braking plate vents include inlets at the radially inner ends of the vents having predetermined inlet cross sectional areas, and outlets at the radially outer ends of the vents having predetermined outlet cross sectional areas.

The airflow director includes an annular flange extending generally radially inwards from the radially inner end of the second braking plate. The flange includes an inner surface forming an angle with respect to the inner surface of the first braking plate such that the distance between these inner surfaces increases as the flange extends radially inwards. The angle is preferably between 0 and 90 degrees. A plurality of director fins extend from the inner surface of the flange. The director fins are preferably formed integrally with some of the braking plate fins. The director fins extend radially inwardly from the braking plate fins and connect the inner surface of the flange with the inner surface of the first braking plate Alternatively, the director fins are not formed integrally with the braking plate fins, but are disposed between the inner surfaces of the flange and first braking plate in alignment with some of the braking plate fins. These director fins may be connected to the inner surface of the flange, the inner surface of the first braking plate or both.

A director vent inlet is formed at the radially inner end of the director vent. The cross sectional area of the director vent inlets are larger than the cross sectional area of the braking plate vent inlets. The larger director vent inlets and the angled inner flange surface create a funnel which directs more air into the braking plate vents thereby improving the cooling effectiveness of the rotor.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

The present invention relates to a vented disc brake rotor for a motor vehicle or the like. It is to be understood that the specific device illustrated in the attached drawings and described in the following specification is simply an exemplary implementation of the invention defined in the appended claims. Hence, specific dimensions and other physical characteristics relating to the embodiments disclosed herein are not to be considered as limiting, unless the claims expressly state otherwise.

Figure 1:
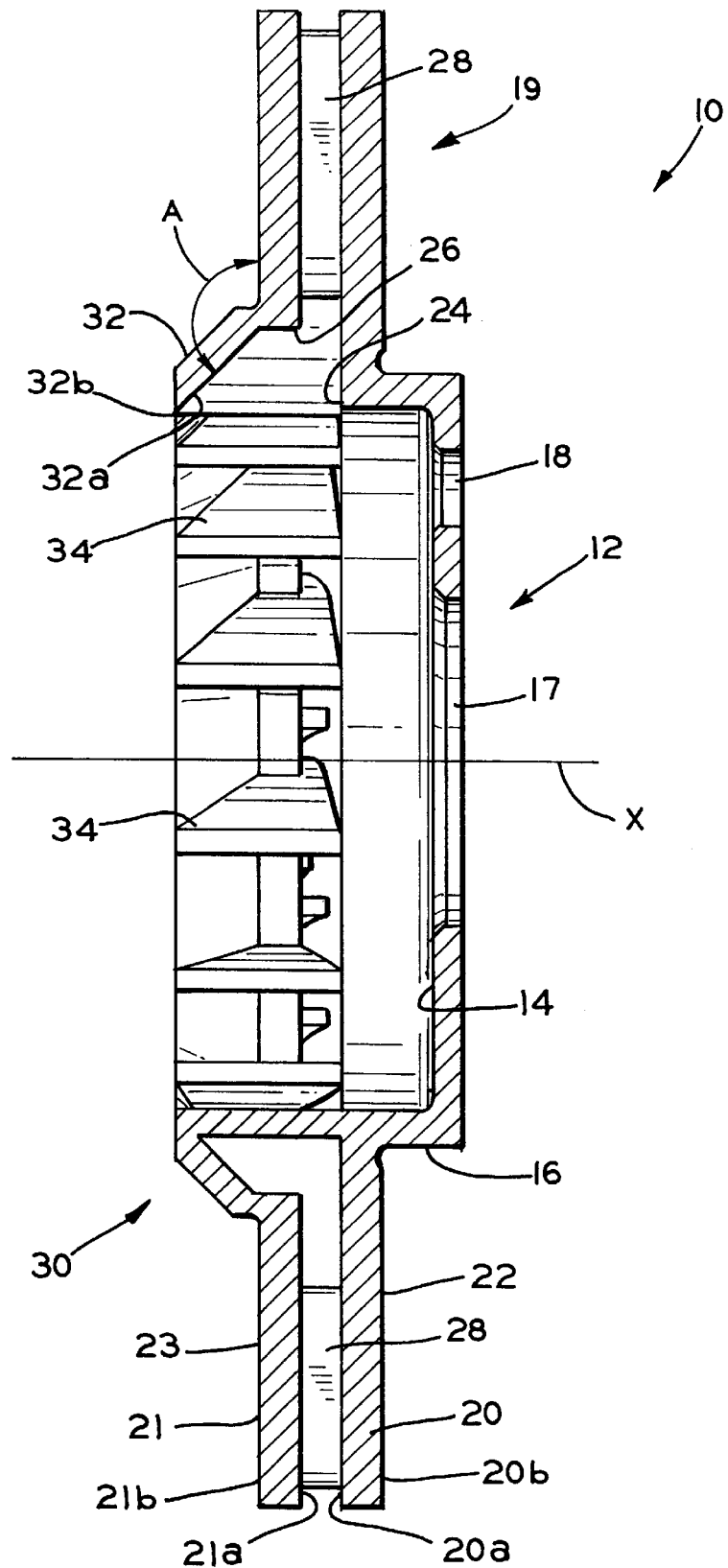
FIG. 1 is a sectional elevational view of a disc brake rotor in accordance with the present invention taken along line 1—1 of FIG. 2.

Referring now to the drawings, there is illustrated in FIG. 1, a vented disc brake rotor formed in accordance with the invention and generally designated by the reference numeral 10. The rotor 10 includes a conventional hat section 12 having a central mounting face 14 for mounting the rotor 10 on an associated vehicle drive member (not shown), such as a spindle or vehicle axle. The hat section 12 also includes a shoulder or hat wall 16 extending from the periphery of the mounting face 14. The hat wall 16 is preferably generally cylindrical, although alternatively, the hat wall or a portion thereof, may be inclined relative to the mounting face 14 forming a portion of a cone, or it may be curved.

The mounting face 14 is provided with a central pilot aperture 17 in which the spindle hub or the like may be closely received, and a plurality of circumferentially spaced apart fastener apertures 18 in which fasteners (not shown) may be received to mount the rotor 10 on an associated drive mechanism in the conventional manner. During operation of the vehicle (not shown), the brake rotor 10 rotates about an axis of rotation also known as the rotor axis X.

The brake rotor 10 also includes a peripheral section 19 having a pair of annular braking plates including a first braking plate 20 and a second braking plate 21, disposed in a spaced apart relationship. The first braking plate 20 preferably extends from the hat wall 16. Preferably the first braking plate 20 is the outboard braking plate with respect to the vehicle when the rotor is mounted thereto, and the second braking plate 21 is the inboard braking plate. Although the embodiment described below includes this preferred arrangement, alternatively; the first braking plate 20 may be the inboard braking plate and the second braking plate 21 may be the outboard braking plate.

Each braking plate 20, 21 has a respective inner surface 20a and 21a which face each other, and a respective outer surface 20b and 21b. An annular braking surface 22 is disposed on the outer surface 20b of the first braking plate 20, and an annular braking surface 23 is disposed on the outer surface 21b of the second braking plate 21. The braking surfaces 22 and 23 are disposed in a coaxial relationship about the rotor axis X for contact with the brake pads (not shown) as described above.

Each braking plate 20, 21 also includes a respective radially inner end 24 and 26, defining the inner diameter of the corresponding braking plate. The first braking plate 20, preferably has a smaller inner diameter than the second braking plate 21.

The rotor 10 also includes a plurality of braking plate fins 28 disposed between the braking plates 20 and 21. The braking plate fins 28 shall be described in further detail below.

An air director 30 is disposed at the radially inner ends of the braking plates 20, 21. The air director 30 includes a flange 32 extending generally radially inwards from the second braking plate 21, and preferably radially inner end of the second braking plate. The flange 32 is preferably anular extending continuously in the circumferential direction with respect to the rotor axis X. Although, alternatively it may not extend continuously in the circumferential direction.

The flange 32 includes an inner surface 32a facing radially inwards towards the rotor axis X. The flange inner surface 32a forms an angle A with respect to the second braking plate braking surface 23. The flange 32 is angled such that distance between the first braking plate inner surface 20a and the flange inner surface 32a increases as the flange extends radially inwards towards the rotor axis X. The angle A is preferably between 90 and 180 degrees.

A plurality of director fins 34 are disposed radially inwards of the braking plate fins 28, between the flange 32 and the first braking plate 20. The director fins 34 are preferably formed integrally with some of the braking plate fins 28, and extend radially inwards to the radially inner end of the flange 32b. The director fins 34 preferably connect the inner surface of the flange 32a with the inner surface of the first braking plate 20a.

Alternatively, the director fins 34 are not formed integrally with the braking plate fins 28, but are disposed between the flange 32 and first braking plate 20. These fins 34 are preferably in alignment with some of the braking plates fins 28, although this is not required to practice the invention. The alignment between the director fins and the braking plate fins 28 reduces the disruption of the flow pattern of air between the braking plates. Disruption in this flow creates turbulent flow and pockets of low pressure. Low pressure pockets can reduce the amount of air that moves between the braking plates. These director fins 34 may be connected to the inner surface of the flange 32a, the inner surface of the first braking plate 20a or both.

Figure 2:
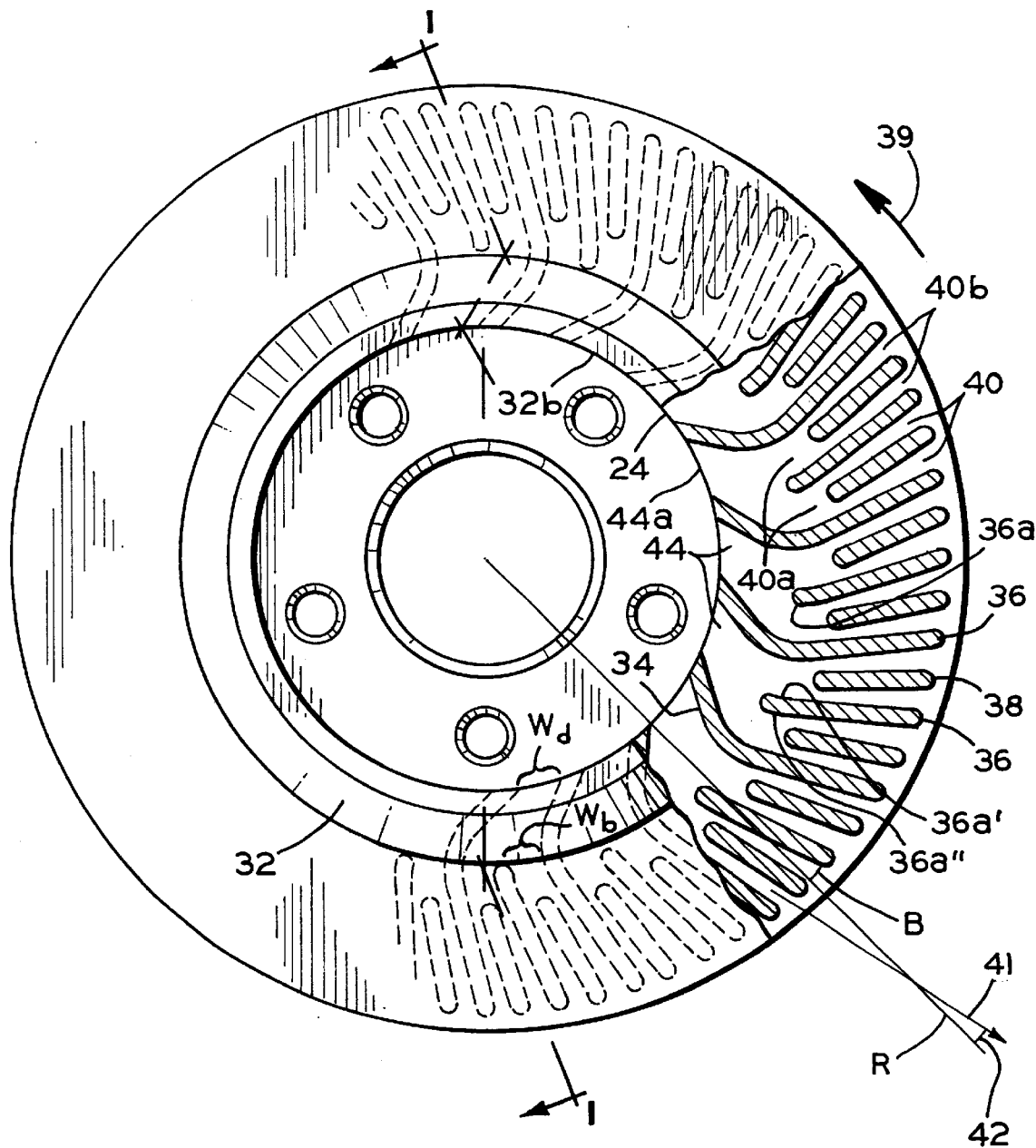
FIG. 2 is a plan view of the vented disc brake rotor illustrated in FIG. 1 showing a portion of the fins beneath the surface in dashed lines and a portion of the fins in cross section.

Referring now to FIG. 2, the braking plate fins are shown in greater detail. The shape and orientation of the braking plate fins 28 may be varied to provide the maximum amount of airflow through the braking plates and any suitable arrangement of braking plate fins may be used with the air director 30. The preferred arrangement of braking plate fins shown in FIG. 2 include a plurality of long fins 36 interspersed with a plurality of short fins 38. The braking plate fins 36 and 38 are disposed around the entire circumference of the annular braking plates 20, 21 between the inner surfaces thereof.

Each long fin 36 extends from radially inner portions of the braking plates 20 and 21 to radially outer portions of the braking plates. The long fins 36 are preferably straight and include a curved radially inner portion 36a. The inner portions 36a of alternate long fins 36 are preferably formed integrally with the director fins 34 as described above.

The radially outer ends of the long fins are preferably oriented to form an angle B with a line R extending along the radius of the rotor 10. Angle B is preferably between 5° and 45°, and more preferably 15°, although any suitable angle may be used to practice this invention.

The curved section 36a of each long curved fin 36 is preferably arched shaped, although any suitable curved shape may be used. The curved section 36a has a concave surface 36a' and a convex surface 36a'. The concave surface 36a' is a leading surface, disposed in the direction of rotation of the rotor 10 shown by arrow 39. The particular configuration of each long fin 36 as described above is not required to practice this invention.

The short fins 38 are preferably straight and do not extend radially inwards as far as the long fins 36. The short fins 38 also preferably form the angle B with the radius R as described above.

Braking plate vents 40 are formed between the braking plates 20, 21 and are defined by the inner surfaces of the braking plates 20a, 21a and the braking plate fins 28. Braking plate vent inlets 40a are formed at the radially inner end of the braking plate vents 40. In the preferred embodiment, using alternating long and short fins, each braking plate vent inlet 40a communicates with the braking plate vents 40 on each side of the short vent fins 38 However, a braking plate vent inlet 40a may communicate with any suitable number of braking plate vents 40. For example, if braking plate fins 28 of equal length are used, each braking plate vent 40 will have a separate inlet 40a.

Each braking plate vent also includes a braking plate vent outlet 40b disposed at the radially outer portion of the vents. The direction of the airflow (shown by arrow 41) at the braking plate vent outlet forms an exit angle 42 with respect to the rotor radius line R. The exit angle 42 preferably equal to angle B described above, although any suitable exit angle may be used. The exit angle 42 is preferably oriented such that the air flow through the rotor 10 increases in velocity.

Figure 3:
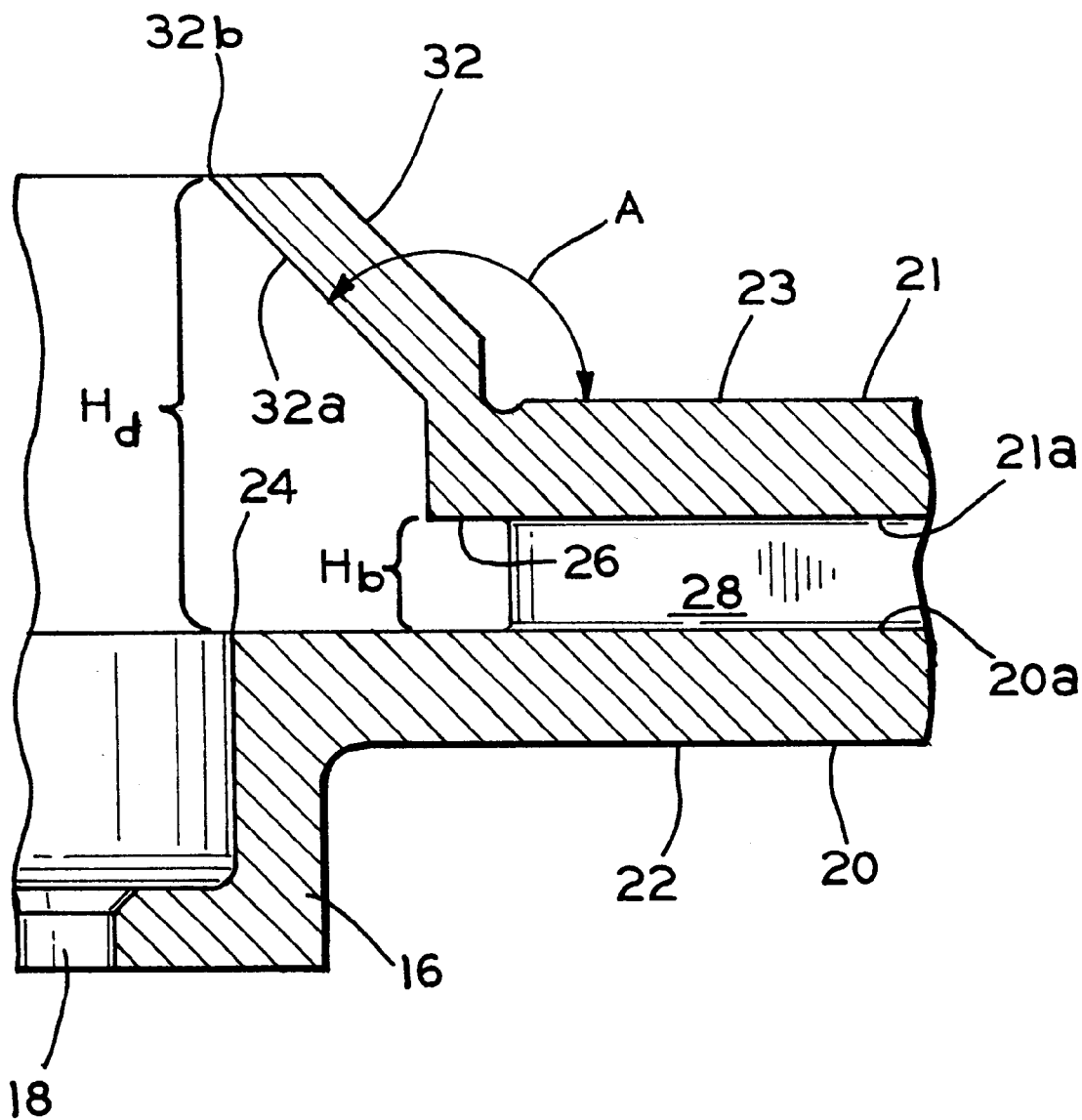
FIG. 3 is an enlarged sectional elevational view of a portion of the rotor illustrated in FIG. 3.

Referring now to FIGS. 2 and 3, director vents 44 are formed between adjacent director fins 34, the flange inner surface 32a, and the first braking plate inner surface 20a. The director vents 44 communicate with the braking plate vents 40 to provide air flow passages between the braking plates 20, 21. In the preferred embodiment, one director vent communicates with four braking plate vents 40, although each director vent may communicate with any suitable number of braking plate vents as determined by the fin configuration used.

Director vent inlets 44a are disposed at the radially inner end of the director vents 44 and defined by the director fins 34, the radially inner end of the flange 32b, and the radially inner end of the first braking plate 24. The height $H_d$ of the director vent inlets 44a is defined between the radially inner end of the flange 32b and the first braking plate inner surface 20a. The width ($W_d$ shown in FIG. 2) of the director vent inlets 44a is defined as the distance between the director fins 34. The director vent inlets 44a have a predetermined cross sectional area $$A_d = H_d \times W_d$$

Similarly, the height $H_b$ of the braking plate vent inlets 40a is defined between the radially inner end 26 of the inner surface of the second braking plate 21a and the inner surface of the first braking plate 20a. The width ($W_b$ shown in FIG. 2) of the braking plate vent inlets 40a is defined as the distance between adjacent long braking plate fins 36 at the radially inner end of the second braking plate 26. The braking plate vent inlets 40a have a predetermined cross sectional area $$A_b = H_b \times W_b$$

When the rotor 10 turns, the cooling air moves between the braking plates 20, 21 by moving into the director vent inlets 44a, through the director vents 44, into the braking plate vent inlets 40a, through the braking plate vents 40 and out through the braking plate vent outlets 40b. The cross sectional area $A_d$ of the director vent inlets 44a is larger than the cross sectional area $A_b$ of the braking plate vent inlets 40a. The larger cross sectional area of the director vent inlets 44a and the angled inner flange surface 32a of the air director create a funnel which directs more air into the braking plate vents 40 thereby improving he cooling effectiveness of the rotor 10.

The brake rotor 10 is preferably cast as an integral one-piece rotor 10, although separate components may be cast and assembled to achieve the finished rotor. In accordance with a preferred embodiment of the invention, the vented rotor 10 is formed by the following method. First, the rotor 10 is cast using any conventional casting method from a suitable material, such as grey iron, aluminum, aluminum MMC or the like, to the desired configuration including at least, the hat section 12 and the annular peripheral section 19. The annular peripheral section 19 should include the braking plates 20 and 21, and the plurality of braking plate fins 28. The annular peripheral section 19 also includes the annular flange 32 and the plurality of director fins 34.

The rotor casting is cooled and then subjected to a finish machining step. The finish machining step preferably includes drilling of the central aperture 17 and the plurality of fastener apertures 18, although these apertures may also be formed in the initial casting. The finish machining step also includes machining each of the braking surfaces 22, 23 of each of the braking plates 20 and 21. Alternatively, the process may include a rough machining step before finish machining.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. An airflow director for a vented disc brake rotor, said rotor including first and second braking plates having outer annular braking surfaces coaxially disposed about a rotor axis X and spaced apart inner surfaces connected together by braking plate fins to define braking plate vents between the braking plates, said braking plate vents having inlets with predetermined cross sectional areas, said airflow director comprising:

a flange extending generally radially inwards from said second braking plate and having a radially inner surface;

a plurality of director fins extending from said radially inner surface of said flange and disposed radially inwards of said braking plate fins; and a plurality of director vents defined between said director fins for providing fluid flow to said braking plate vents, said director vents having director vent inlets having larger cross sectional areas than said braking plate vent inlets for increasing the fluid flow through said braking plate vent inlets.

2. The airflow director defined in claim 1 wherein said first and second braking plates have radially inner ends defining the inner diameters of said first and second braking plates and said first braking plate has a smaller inner diameter than said second braking plate.

3. The airflow director defined in claim 2 wherein said flange extends generally radially inwards from the radially inner end of said second braking plate.

4. The airflow director defined in claim 3 wherein said plurality of director fins extend between said radially inner surface of said flange and said first braking plate inner surface.

5. The airflow director defined in claim 4 wherein said flange inner surface forms an angle A between 90 and 180 degrees with respect to said second braking plate of said braking surface.

6. The airflow director defined in claim 1 wherein said director fins are formed integrally with some of said braking plate fins.

7. The airflow director defined in claim 1 wherein said director vents communicate with a plurality of braking plate vents.

8. A vented brake rotor having an air director, said rotor comprising:

first and second braking plates having outer annular braking surfaces coaxially disposed about a rotor axis of rotation X, and spaced apart inner surfaces;

braking plate fins disposed between said braking plate inner surfaces;

braking plate vents defined between said braking plates for providing fluid flow between said braking plates, said braking plate vents having inlets with predetermined cross sectional areas;

a flange extending generally radially inwards from said second braking plate and having a radially inner surface;

a plurality of director fins extending from said radially inner surface of said flange and disposed radially inwards of said braking plate fins; and a plurality of director vents defined between said director fins for providing fluid flow to said braking plate vents, said director vents having director vent inlets having larger cross sectional areas than said braking plate vent inlets for increasing the fluid flow through said braking plate vent inlets.

9. The brake rotor defined in claim 8 wherein said first and second braking plates have radially inner ends defining the inner diameters of said first and second braking plates and said first braking plate has a smaller inner diameter than said second braking plate.

10. The brake rotor defined in claim 9 wherein said flange extends generally radially inwards from the radially inner end of said second braking plate.

11. The brake rotor defined in claim 10 wherein said plurality of director fins extend between said radially inner surface of said flange and said second braking plate inner surface.

12. The brake rotor defined in claim 11 wherein said flange inner surface forms an angle A between 90 and 180 degrees with respect to said second braking plate of said braking surface.

13. The brake rotor defined in claim 8 wherein said director fins are formed integrally with some of said braking plate fins.

14. The brake rotor defined in claim 8 wherein said director vents communicate with a plurality of braking plate vents.

15. The brake rotor defined in claim 8 wherein said braking plate fins include long fins and short fins.

16. The brake rotor defined in claim 15 wherein said long braking plate fins include a radially outer straight portion and a radially inner curved portion, said radially inner curved portion having a concave surface disposed in the direction of rotation of the rotor.

17. The brake rotor defined in claim 16 wherein said radially outer straight portion of said long braking plate fins forms an angle between 5° and 45° with respect to the radius of said rotor.

18. The brake rotor defined in claim 17 wherein said radially outer straight portion of said long braking plate fins forms an angle of 15° with respect to the radius of said rotor.

19. The brake rotor defined in claim 18 wherein said long braking plate fins extend radially inwards farther than said short braking plate fins.

20. The brake rotor defined in claim 19 wherein said short braking plate fins are generally straight.

21. The brake rotor defined in claim 20 wherein said short straight braking plate fins form an angle between 5° and 45° with respect to the radius of said rotor.

22. The brake rotor defined in claim 21 wherein said short straight braking plate fins form an angle of 15° with respect to the radius of said rotor.

\* \* \* \* \*